(12) United States Patent
VanBlon et al.

(10) Patent No.: US 11,269,667 B2
(45) Date of Patent: Mar. 8, 2022

(54) TECHNIQUES TO SWITCH BETWEEN DIFFERENT TYPES OF VIRTUAL ASSISTANCE BASED ON THRESHOLD BEING MET

(71) Applicant: Lenovo (singapore) pte. ltd., Singapore (SG)

(72) Inventors: Russell Speight VanBlon, Raleigh, NC (US); Girishpurushottam Hoogar, Apex, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/931,088

(22) Filed: Jul. 16, 2020

(65) Prior Publication Data
US 2022/0019450 A1    Jan. 20, 2022

(51) Int. Cl.
*G06F 9/451* (2018.01)
*G06T 19/00* (2011.01)
*G06F 3/16* (2006.01)
*H04M 1/72454* (2021.01)
*G06F 3/01* (2006.01)
*G10L 15/22* (2006.01)
*G10L 25/78* (2013.01)

(52) U.S. Cl.
CPC .............. *G06F 9/453* (2018.02); *G06F 3/013* (2013.01); *G06F 3/167* (2013.01); *G06T 19/006* (2013.01); *H04M 1/72454* (2021.01); *G10L 2015/226* (2013.01); *G10L 2015/228* (2013.01); *G10L 2025/786* (2013.01)

(58) Field of Classification Search
CPC .... G06F 9/453; G06F 3/167; H04M 1/72454; G06T 19/006; G10L 2015/226; G10L 2015/228; G10L 2025/786
See application file for complete search history.

(56) References Cited

U.S. PATENT DOCUMENTS

| | | | |
|---|---|---|---|
| 8,494,507 B1* | 7/2013 | Tedesco | G09B 21/009 455/418 |
| 10,254,826 B2* | 4/2019 | Clement | G02B 27/017 |
| 10,271,093 B1* | 4/2019 | Jobanputra | H04N 21/835 |
| 10,568,573 B2* | 2/2020 | Campbell | A61B 3/14 |

(Continued)

FOREIGN PATENT DOCUMENTS

CN          210466786 U  *  5/2020

*Primary Examiner* — Justin R. Blaufeld
(74) *Attorney, Agent, or Firm* — John M. Rogitz; John L. Rogitz

(57) ABSTRACT

In one aspect, a device may include at least one processor, a display accessible to the at least one processor, and storage accessible to the at least one processor. The storage may include instructions executable by the at least one processor to receive, at the device, input from at least one sensor. The instructions may also be executable to determine whether a threshold is met based at least in part on the input from the at least one sensor. Responsive to the threshold not being met, the instructions may be executable to provide virtual assistance audibly. Responsive to the threshold being met, the instructions may be executable to present visual virtual assistance on the display using an avatar or other character. In various examples, the device may be a headset or other augmented reality device.

20 Claims, 9 Drawing Sheets

(56) References Cited

U.S. PATENT DOCUMENTS

| | | | |
|---|---|---|---|
| 10,685,664 B1* | 6/2020 | Kristjansson | G06F 3/167 |
| 10,826,862 B1* | 11/2020 | Suprasadachandran Pillai | H04L 51/10 |
| 11,010,129 B1* | 5/2021 | Rakshit | G06F 9/453 |
| 2005/0138647 A1* | 6/2005 | Bou-ghannam | G06F 9/542 |
| | | | 719/328 |
| 2006/0085183 A1* | 4/2006 | Jain | G10L 17/26 |
| | | | 704/233 |
| 2006/0139312 A1* | 6/2006 | Sinclair | G06F 3/0481 |
| | | | 345/156 |
| 2013/0300636 A1* | 11/2013 | Cunningham | G06F 3/013 |
| | | | 345/8 |
| 2014/0300636 A1* | 10/2014 | Miyazaya | H04S 7/304 |
| | | | 345/633 |
| 2014/0303971 A1* | 10/2014 | Yl | G06F 3/165 |
| | | | 704/233 |
| 2015/0085251 A1* | 3/2015 | Larsen | A61B 3/14 |
| | | | 351/206 |
| 2015/0162000 A1* | 6/2015 | Di Censo | G06F 16/433 |
| | | | 704/270.1 |
| 2015/0302585 A1* | 10/2015 | VanBlon | G06F 3/0304 |
| | | | 345/173 |
| 2016/0283190 A1* | 9/2016 | Nakamura | G06F 3/167 |
| 2017/0092270 A1* | 3/2017 | Newendorp | G06F 3/167 |
| 2017/0249934 A1* | 8/2017 | Kang | G06F 40/30 |
| 2017/0287476 A1* | 10/2017 | Tzirkel-Hancock | G10L 15/22 |
| 2017/0357478 A1* | 12/2017 | Piersol | G06F 3/167 |
| 2018/0097493 A1* | 4/2018 | Weksler | H04R 3/00 |
| 2019/0311718 A1* | 10/2019 | Huber | G06F 3/013 |
| 2019/0332170 A1* | 10/2019 | Tungare | G06F 3/012 |
| 2020/0075036 A1* | 3/2020 | Shin | G10L 25/21 |
| 2020/0090647 A1* | 3/2020 | Kurtz | G06F 3/167 |
| 2020/0103963 A1* | 4/2020 | Kelly | G06F 3/165 |
| 2020/0105264 A1* | 4/2020 | Jang | G06F 3/167 |
| 2020/0105291 A1* | 4/2020 | Sheaffer | H04R 3/10 |
| 2021/0012775 A1* | 1/2021 | Kang | G10L 15/083 |

* cited by examiner

TECHNIQUES TO SWITCH BETWEEN DIFFERENT TYPES OF VIRTUAL ASSISTANCE BASED ON THRESHOLD BEING MET

FIELD

The present application relates to technically inventive, non-routine solutions that are necessarily rooted in computer technology and that produce concrete technical improvements.

BACKGROUND

As recognized herein, current augmented reality (AR) headsets can provide audible assistance as part of setting up an AR experience. However, as also recognized herein, such audible assistance might be difficult or impossible to hear in relatively loud environments, leading to user frustration as well as an inability to configure the device and/or acclimate the user to proper interfacing with the device as part of the AR experience. There are currently no adequate solutions to the foregoing computer-related, technological problem.

SUMMARY

Accordingly, in one aspect a headset includes at least one processor, a display accessible to the at least one processor, and storage accessible to the at least one processor. The storage includes instructions executable by the at least one processor to receive, at the headset, input from at least one sensor. The instructions are also executable to determine whether a threshold is met based at least in part on the input from the at least one sensor. Responsive to the threshold not being met, the instructions are executable to provide virtual assistance audibly. Responsive to the threshold being met, the instructions are executable to present visual virtual assistance on the display.

In some example implementations, the visual virtual assistance may be presented at least in part using a character presented on the display. For example, the character may be an avatar representing a digital assistant being used to provide the visual virtual assistance.

Additionally, in some example implementations the at least one sensor may include a microphone, the threshold may be a sound threshold, and the instructions may be executable to receive input from the microphone. In these implementations, the instructions may then be executable to, based at least in part on the input from the microphone, determine whether sound indicated in the input from the microphone is above the sound threshold. Responsive to the sound being below the sound threshold, the instructions may be executable to provide the virtual assistance audibly. Responsive to the sound being above the sound threshold, the instructions may be executable to present the visual virtual assistance on the display. Additionally, the sound threshold may be a dynamic sound threshold that varies based on a volume level at which audio is set to be output, based on a type of audio rendering device that is to be used to output audio associated with a function of the headset, and/or based on whether noise cancelling software will be used in conjunction with a function of the headset.

Also in some example implementations, the at least one sensor may include a light sensor, the threshold may be a low light threshold, and the instructions may be executable to receive input from the light sensor. The instructions may also be executable to, based at least in part on the input from the light sensor, determine whether light indicated in the input from the light sensor is above the low light threshold. Responsive to the light indicated in the input being above the low light threshold, the instructions may be executable to provide the virtual assistance audibly. Responsive to the light indicated in the input being below the low light threshold, the instructions may be executable to present the visual virtual assistance on the display.

Additionally, in some example embodiments both the visual instructions and the instructions provided audibly may indicate real-world objects with which a user of the headset is to interact, virtual objects with which the user is to interact, and/or steps the user is to take to configure one or more settings of the headset.

In another aspect, a method includes receiving, at a device, input from at least one sensor. Based at least in part on the input from the at least one sensor, the method includes determining whether a threshold is met. The method also includes providing virtual assistance audibly responsive to the threshold not being met as well as presenting, on a display, visual virtual assistance at least in part using a character presented on the display responsive to the threshold being met.

In certain examples, the character may be an avatar representing a digital assistant being used to provide the visual virtual assistance.

Additionally, in some example implementations the at least one sensor may include a microphone, the threshold may be a sound threshold, and the method may include receiving input from the microphone and then determining, based at least in part on the input from the microphone, whether sound indicated in the input from the microphone is above the sound threshold. In these implementations, the method may include providing the virtual assistance audibly responsive to the sound being below the sound threshold. Additionally, the method may include presenting, on the display, the visual virtual assistance at least in part using the character presented on the display responsive to the sound being above the sound threshold. Still further, in some example embodiments the sound threshold may vary based on a volume level at which audio is set to be output using the device, based on a type of audio rendering device to be used to output audio associated with a function of the device, and/or based on whether noise cancelling software is being used to output sound using the device.

Also in some example implementations, the at least one sensor may include light sensor, the threshold may be a low light threshold, and the method may include receiving input from the light sensor and then determining, based at least in part on the input from the light sensor, whether light indicated in the input from the light sensor is above the low light threshold. Then method may include providing the virtual assistance audibly responsive to the light indicated in the input being above the low light threshold. The method may also include presenting, on the display, the visual virtual assistance at least in part using the character presented on the display responsive to the light indicated in the input being below the low light threshold.

Still further, in certain example implementations both the visual virtual assistance and the virtual assistance provide audibly may be provided as part of an augmented reality experience facilitated by the device.

In still another aspect, at least one computer readable storage medium (CRSM) that is not a transitory signal includes instructions executable by at least one processor to receive input from a sensor accessible to the at least one processor and to, based at least in part on the input from the sensor, determine whether a threshold is met. The instructions are also executable to provide one or more notifications audibly using the at least one processor responsive to the threshold not being met and to present, on a display accessible to the at least one processor, one or more visual notifications at least in part using an animated character responsive to the threshold being met.

In certain examples, the display may be disposed on a device configured to present an augmented reality experience. Additionally, the sensor may be a microphone, the threshold may be a sound threshold, and the sound threshold may vary. For example, the sound threshold may vary based on a volume level at which audio is set to be output using the at least one processor, a type of audio rendering device to be used by the at least one processor to output audio, and/or whether noise cancelling software is to be used to output sound using the at least one processor.

The details of present principles, both as to their structure and operation, can best be understood in reference to the accompanying drawings, in which like reference numerals refer to like parts, and in which:

DETAILED DESCRIPTION

Figure 1:
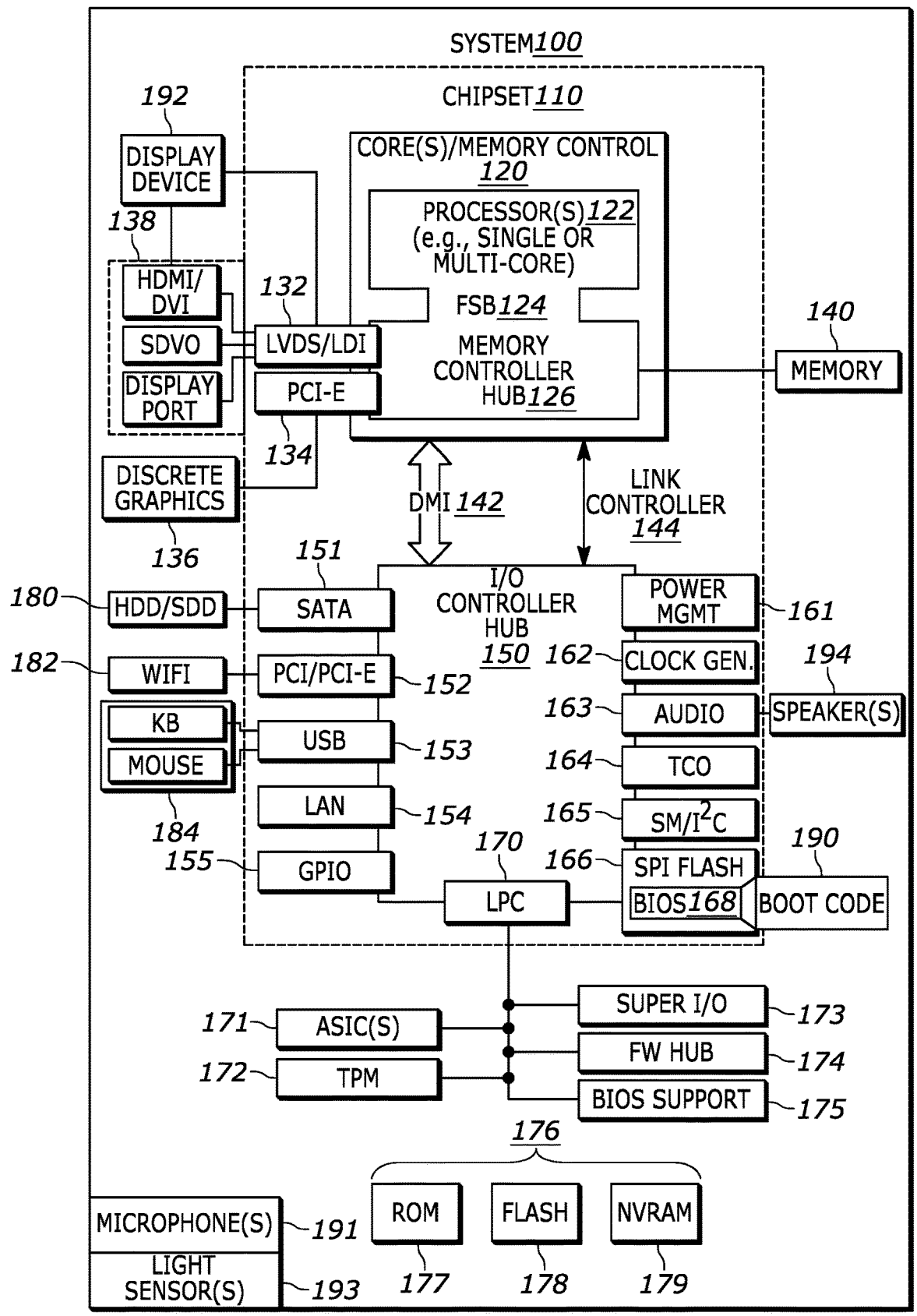
FIG. 1 is a block diagram of an example system consistent with present principles.

Among other things, the present application describes a visual assistant in augmented reality (AR) and/or virtual reality (VR) experiences where the assistant can aid a user in getting started with or configuring the device itself, help a user learn how to play a game or interact with the device, instruct a user how to operate or repair a battery or other machinery different from the headset, etc. For such purposes, the visual assistant may be in the form of a character and may be used in conjunction with other directional guides displayed to the user in combination with the real world. Voice cues may also be provided to the user when appropriate as described further below.

Thus, a headset or other AR/VR device consistent with present principles may detect loud environments and switch between audio or visual assistance. For example, in loud environments, visual assistance may be enabled to inform the user on how to interact with the system, but in quiet environments audio cues may be provided to the user instead.

E.g., for visual assistance, text and/or visual prompts may be presented to indicate virtual and real-world objects to a user wearing the headset, indicating what the user should focus on next. But whether visual or audio assistance is provided, it may be used to help the user identify real world items that the user should focus on, interact with via real world gestures, etc. as well as to let the user know when the user should speak voice commands, focus their eyes on specific objects, etc. Thus, during real-time AR instruction, the headset may change between audible (e.g., voice) and visual cues depending on ambient noise.

Additionally, a dynamic sound threshold may be used by the device to determine when to switch between audible and visual cues. The dynamic threshold may vary based on a particular speaker or sound volume level at which audio would be provided, ambient noise, a type of audio device (e.g., headphones or loudspeakers) that are to be used to output audio, and/or whether noise-cancellation has been enabled.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more microphones 191 that provide input from the microphone 191 to the processor 122 based on audio that is detected, such voice input or ambient noise. The system 100 may also include one or more light sensors 193 such as a photo diode (e.g., silicon photo diode) and/or a camera that provides input (e.g., images) to the processor 122 based on light that is detected. If a camera is used, the camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
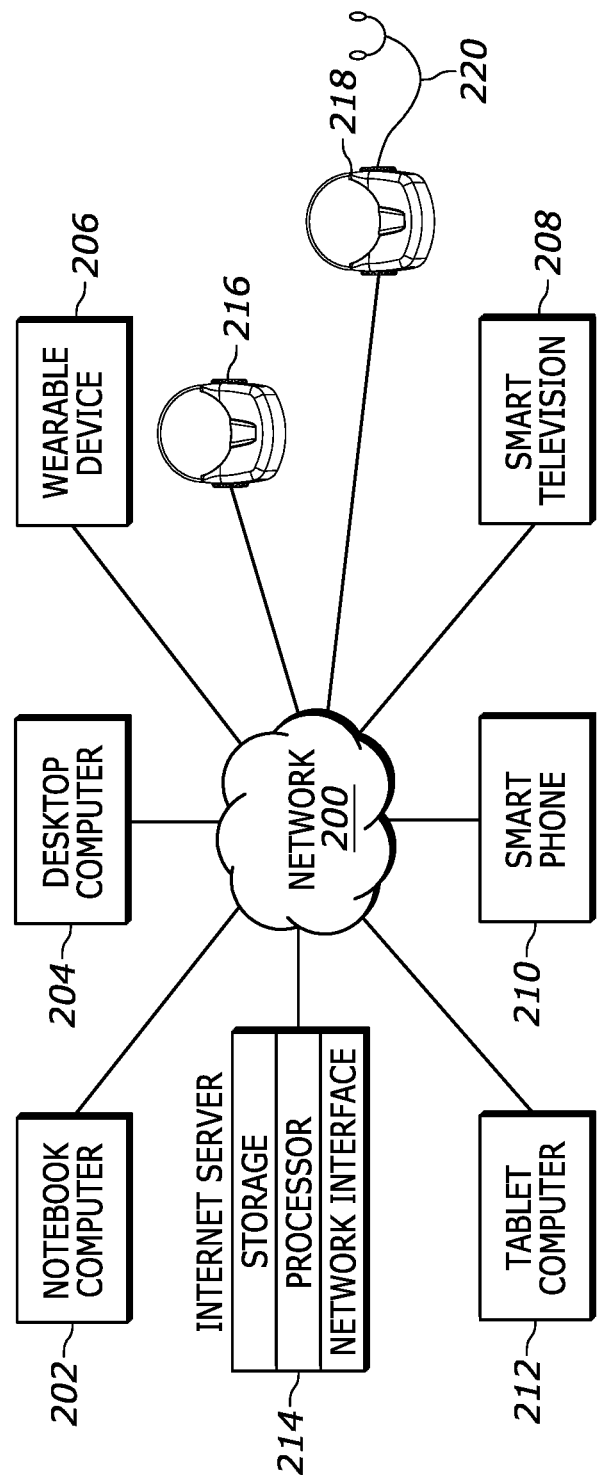
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, headsets 216 and 218, headphones 220, and a server 214 such as an Internet server that may provide cloud storage accessible to the devices 202-212, 216, 218, 220. It is to be understood that the devices 202-220 are configured to communicate with each other over the network 200 to undertake present principles.

Describing the headphones 220 in more detail, they may be, for example, ear buds style headphones as shown. However, they may also be established by ear cup headphones and other types of headphones. The headphones 220 may be wiredly or wirelessly connected to one of the headsets such as the headset 216 for presentation of audio that is linked to visual content presented on the display of the headset 216 consistent with present principles, such as to present audio of an augmented reality experience for which corresponding visual content is presented on the headset's display. However, such audio may additionally or alternatively be presented via other types of speakers as well, such as stand-alone Bluetooth speakers and other loudspeakers.

Figure 3:
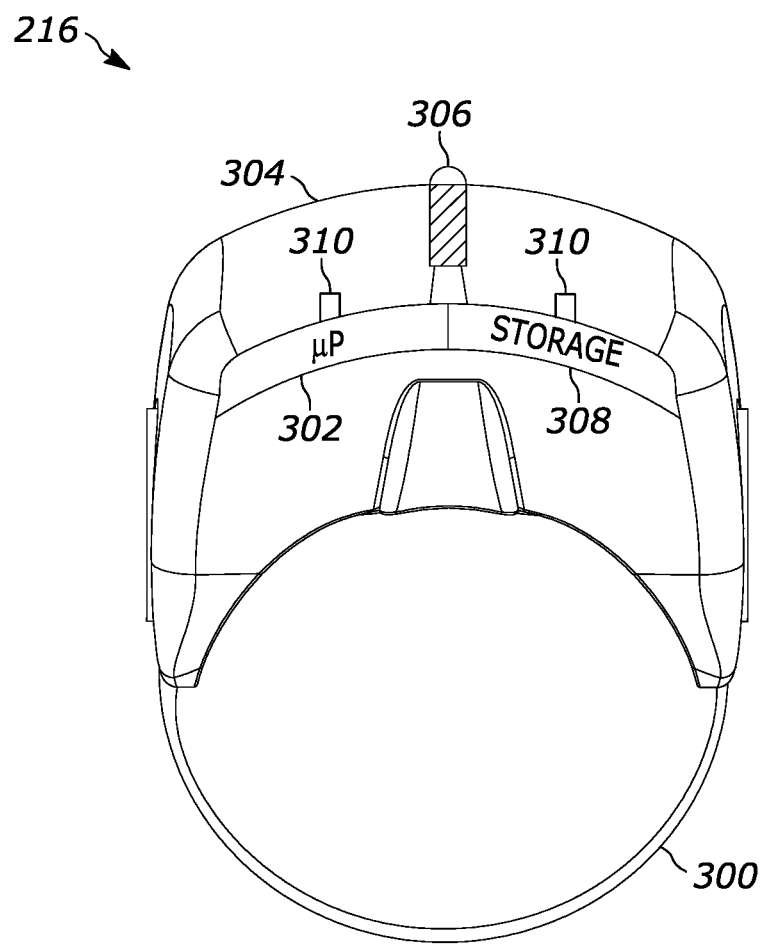
FIG. 3 is a block diagram of an example headset consistent with present principles.

Now describing FIG. 3, it shows a top plan view of a headset such as the headset 216 consistent with present principles. The headset 216 may include a housing 300, at least one processor 302 in the housing, and a transparent "heads up" display 306 accessible to the at least one processor 302 and coupled to the housing 300. The display 306 may for example have discrete left and right eye pieces as shown for presentation of stereoscopic and/or augmented reality images/objects using augmented reality software to make the images/objects appear as though located three dimensionally in the real world consistent with present principles.

The headset 216 may also include one or more forward-facing cameras 306. As shown, the camera 306 may be mounted on a bridge portion of the display 304 so that it may have an outward-facing field of view similar to that of a user wearing the headset 216 for object identification using eye tracking. However, the camera(s) 306 may be located at other headset locations as well.

In addition to object identification, the camera(s) 306 may also be used for, among other things, identifying ambient light levels consistent with present principles. The camera(s) 306 may also be used for computer vision, image registration, spatial mapping, and/or simultaneous localization and mapping (SLAM) for augmented reality (AR) processing and presentation of AR content in conjunction with the headset's location in the real world consistent with present principles. Further note that in some examples, inward-facing cameras 310 may also be mounted within the headset 216 and oriented to image the user's eyes for eye tracking while the user wears the headset 216 consistent with present principles.

Additionally, the headset 316 may include storage 308 accessible to the processor 302 and coupled to the housing 300, as well as still other components not shown for simplicity such as a network interface for communicating over a network such as the Internet and a battery for powering components of the headset 216 such as the camera(s) 306. Additionally, note that while the headset 216 is illustrated as a head-circumscribing augmented reality (AR) headset, it may also be established by computerized smart glasses or another type of headset.

For example, the headset may be established by a virtual reality (VR) headset that may not have a transparent display but may still be able to present virtual AR objects/content on its display along with a real-world, real-time camera feed of an environment imaged by the front-facing camera(s) 306 to provide an AR experience to the user. This AR technique might similarly apply to other mobile devices with front and rear-facing cameras and non-transparent displays, such as smart phones and tablet computers, in order to perform eye tracking and/or present AR content over top of a real-world, real-time camera feed of the real world consistent with present principles.

Figure 4:
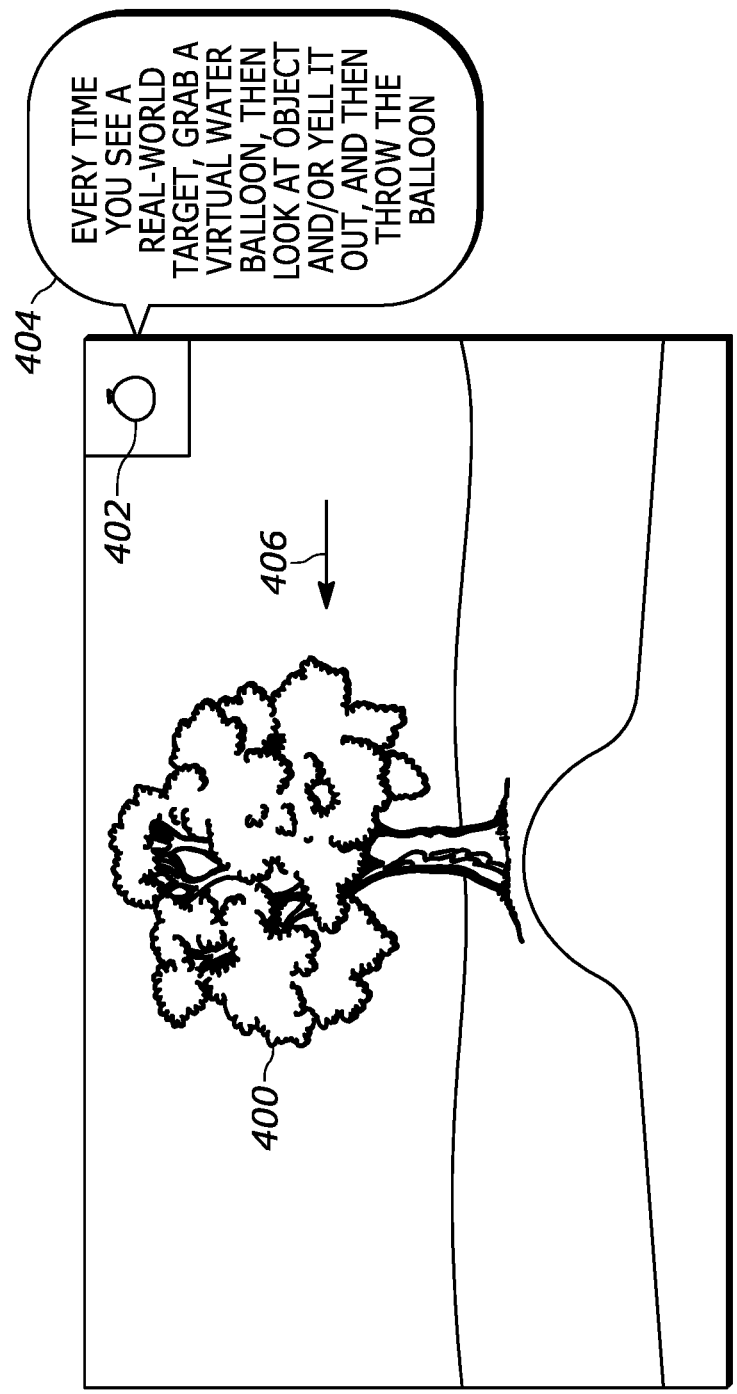
FIGS. 4 and 5 show examples of various virtual assistance that may be provided to a user as part of a gaming AR experience consistent with present principles.
Figure 5:
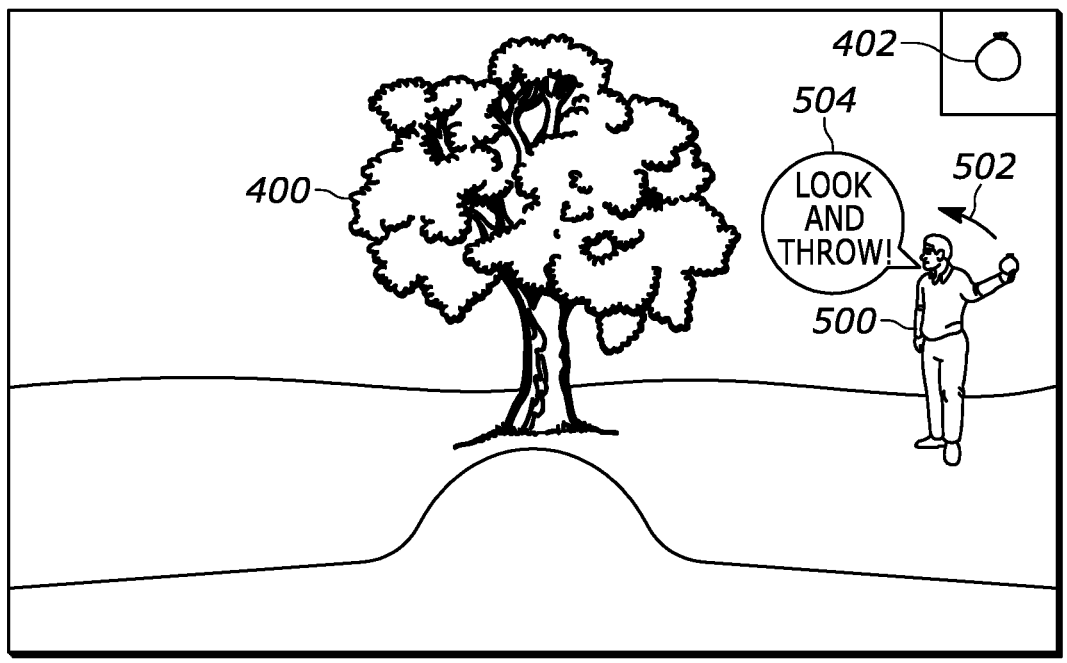

Now in reference to FIGS. 4 and 5, suppose an end-user is wearing a headset such as the headset 216 and is looking out of the headset's transparent display into the user's real-world environment. This perspective is shown in both of FIGS. 4 and 5, where the user is looking out of the headset to see a real-life tree 400. Also suppose that an augmented reality (AR) experience is being facilitated by the headset while the user looks out of the headset's display. In this example, the AR experience is a game relating to throwing virtual objects such as virtual water balloons at real-life objects observed by the user. A virtual image 402 of a water balloon is shown in both of FIGS. 4 and 5.

Now specifically in reference to FIG. 4, suppose the real-world environment in which the user is disposed is relatively quiet such that ambient noise and/or other noise (such as a proximate other person speaking) is below a preestablished sound threshold. The threshold itself may have been preestablished by the manufacturer of the headset, developer of the game, the end-user himself or herself, etc. In any case, based on the ambient noise and/or any other detected noise being above the threshold as detected by a microphone in communication with the headset (e.g., on the headset itself or on a smart phone in communication with the headset), the headset may determine that audible instructions/virtual assistance 404 can be provided to the user via the headset using loudspeakers on the headset, speakers on headphones connected to the headset, speakers on a smart phone or other device connected to the headset, etc.

In this example, the audible output includes a computerized voice notifying the user that every time the user sees a real-world target, the user can gesture to virtually "grab" a water balloon 402 from where it appears to be located relative to the user as presented on the headset's display. The audible instructions 404 may then indicate that the user can either look at the real-world target at which the user wishes to throw the virtual water balloon or speak the target at which the user wishes to throw the virtual water balloon. The audible instructions 404 may then indicate that the user at that point can throw the balloon, which in turn may cause the headset to present the water balloon as traveling through the air and ultimately striking the user's desired target, exploding on impact.

Further, note that in some examples the audible instructions 404 may be accompanied by another virtual object such as a virtual arrow 406 that may be presented using the headset's display in order to indicate, in three dimensional (3D) representation using AR software, a real-world object the user might throw a balloon at as part of the game. In this case, the arrow points at the tree 400.

The gesture itself of grabbing a virtual water balloon may be identified by the headset using gesture recognition software as well as an outward-facing camera on the headset to identify the direction and depth of the gesture to then determine whether the user is attempting to grab a virtual balloon based on where the virtual balloon is represented as existing in the real-world via the AR experience.

Additionally, in order for the headset to identify the user's intended target based on what the user is looking at, eye tracking software may be executed using inward-facing cameras in the headset in order to track the user's eyes. The outward facing cameras on the headset may also be used along with execution of object recognition software to identify real-world objects in the user's field of view. The headset may then identify what real-world object the user is looking at as an intended balloon target based on the identifications of where the user is looking (as identified from the inward-facing cameras) and what object(s) in the user's field of view correspond to that location (as identified from the outward-facing cameras).

Also note that if voice input is used by the user to verbally indicate the user's intended balloon target according to the instructions 404, voice recognition software may be executed by the headset to identify the subject of the user's verbal exclamation. Object recognition software and an outward-facing camera on the headset may then be used similar to as set forth in the paragraph above to identify a real-world object in the user's field of view that corresponds to the subject of the user's verbal exclamation.

Turning now to FIG. 5, suppose that ambient noise and/or other sound is above the threshold sound level rather than below it. Based on identifying as much, the headset may determine to not present audible instructions such as the instructions 404 since it may be difficult for the user to hear the audible instructions given the current level of ambient noise around the user (e.g., a crowd of people talking).

Accordingly, as shown in FIG. 5 the headset may present a virtual avatar, cartoon character, or other virtual character 500 on the headset's display instead of presenting the audible instructions 404. The character 500 may represent, for instance, a virtual or digital assistant being used to provide the virtual assistance. The headset may also animate the character 500 to demonstrate grabbing a balloon from the area at which the virtual image 402 is presented and then throwing the balloon at a real-life target such as the tree 400 (as demonstrated by the motion arrow 502). The headset may then animate the thrown virtual balloon to explode upon virtually striking the tree. This animation may thus notify the user of the same type of action that the user himself or herself can take as part of the balloon-throwing game.

In some examples, a visual speech bubble with instructions 504 may also be presented on the headset's display as a notification for the user to read words represented as being spoken by the character 500. The visual instructions/text 504 may be similar in content and length as the instructions 404, though here in this example they have been abbreviated to an instruction to look at an intended real-life target and then throw a virtual balloon.

Still further, note that in some examples even though it may be difficult for the user to hear audible instructions, the headset may still present audible instructions along with the visual assistance according to the example of FIG. 5. For example, audible instructions such as those corresponding to the instructions 504 or 404 may be presented anyway as a compliment to the visual assistance provided via the headset's display using the character 500 and instructions 504.

Figure 6:
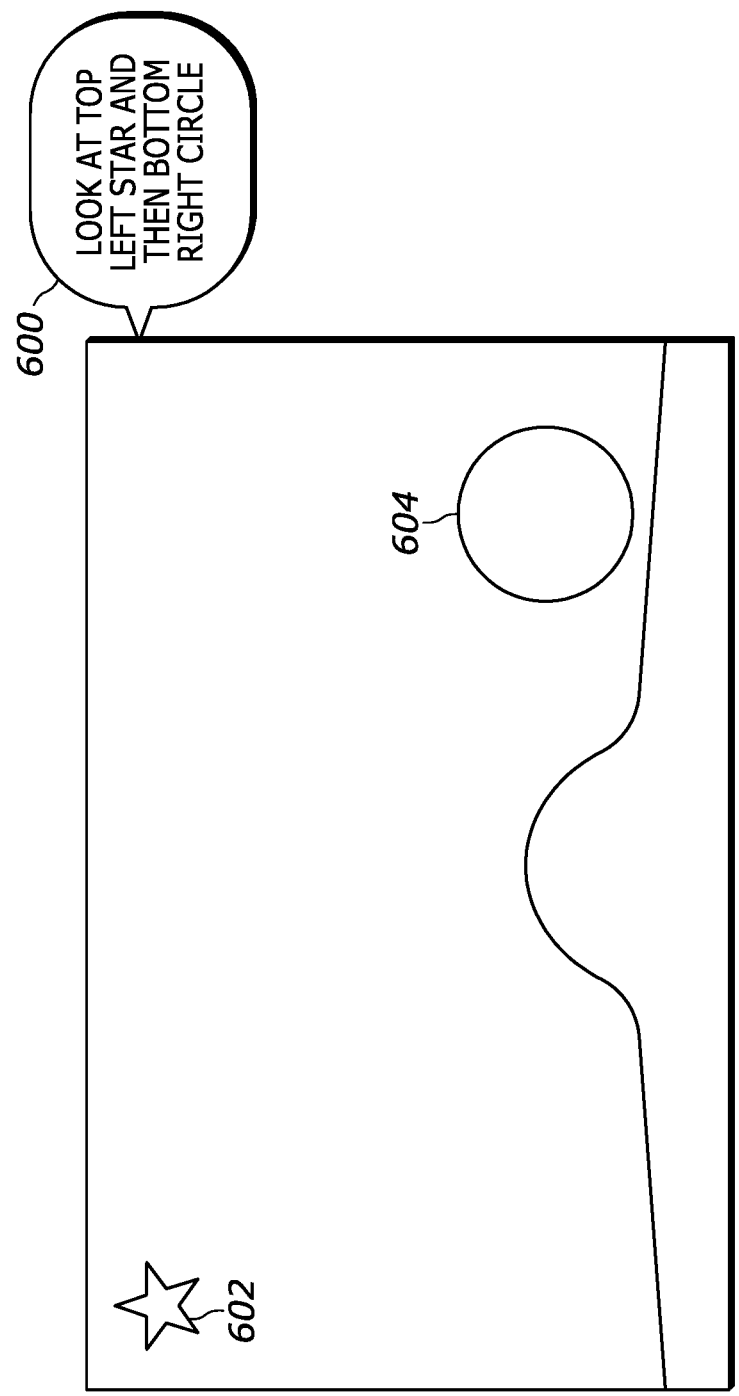
FIGS. 6-8 show examples of various virtual assistance that may be provided to the user as part of a configuration process for tailoring eye tracking to the user consistent with present principles.
Figure 7:
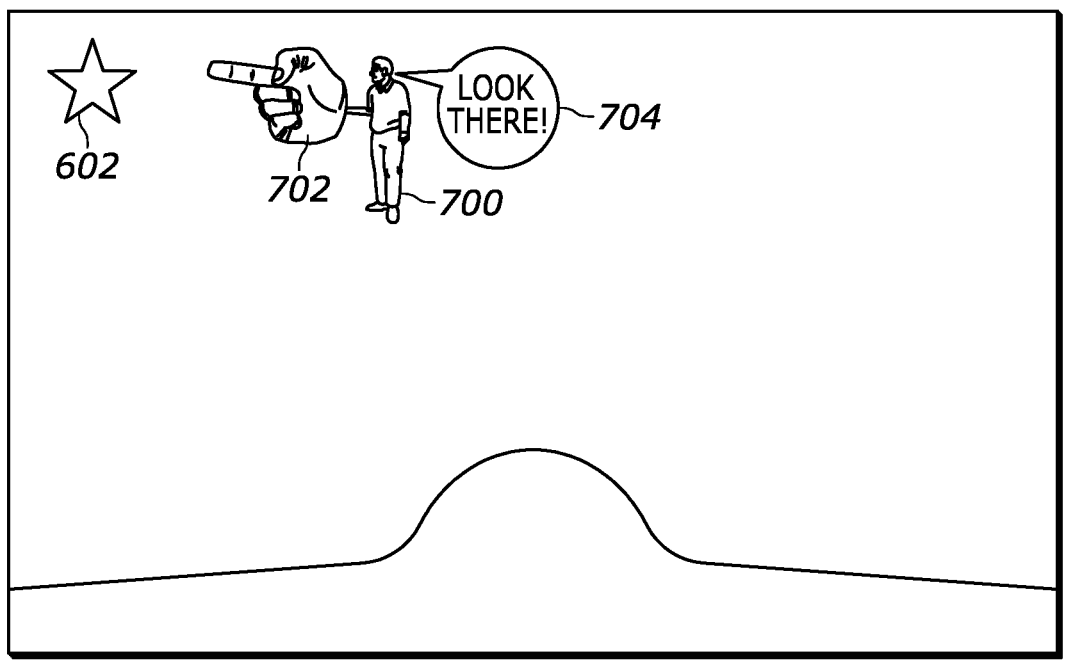
Figure 8:
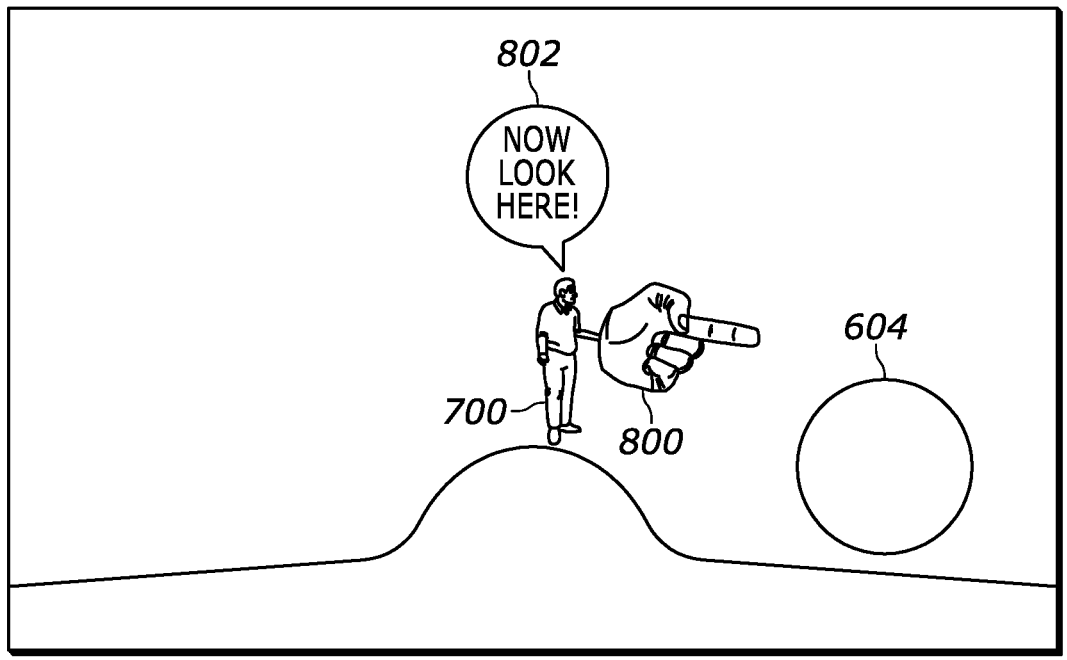

Now in reference to FIGS. 6-8, suppose as a different example that a new end-user has just put on a headset that should have settings tailored to the user to provide an optimal AR experience to the user. Part of the settings configuration process may include the user looking at various parts of the headset's display when prompted in order for the headset to calibrate its eye tracking capabilities to the particular user wearing the headset.

Accordingly, FIGS. 6-8 show the perspective of the user while wearing the headset and looking through its transparent display into the real world. And as shown in FIG. 6 in particular, when the headset determines that ambient noise and/or other sound is below a threshold level of sound, the headset may audibly provide instructions/virtual assistance 600 via speakers in communication with the headset to notify the user of what to do to tailor the headset's eye tracking capabilities to that particular end-user. As shown, the instructions 600 indicate that the user should first look at the virtual star 602 in the top left corner of the user's field of view and then look at the virtual circle 604 in the bottom right corner of the field of view. The headset may then execute eye tracking software to identify the user as looking at the star 602 and then circle 604 in sequence and configure its eye tracking software accordingly.

However, suppose the user is in a relatively loud environment in which ambient noise or other sound is above the sound threshold rather than below it according to the example of FIG. 6. This situation is reflected in FIGS. 7 and 8. As shown in FIG. 7, an avatar or other character 700 with a disproportionally large hand 704 is presented on the headset's display so that an index finger on the virtual hand 704 points toward the star 602 to visually indicate where the user should look. Also note that a visual speech bubble 704 may also be presented on the headset's display and indicate the text "Look here!" as a notification for the user to look at the virtual star 602. Also note that the circle 604 has not yet been presented at this point so that the user does not look at it.

However, after the headset has identified the user as looking at the star 602, the headset may then remove the star 602 from presentation on the headset's display and then present the circle 604, as shown in FIG. 8. The avatar 700 may be animated to walk "across" the display toward the circle 604 and then to stand near the circle 604, at which point another disproportionally large hand 800 may be presented and point with an index finger toward the circle 604 to visually indicate the virtual object at which the user should look at this point. Also note that a visual speech bubble 802 may be presented on the headset's display in some examples and indicate the text "Now look here!" as a notification for the user to look at the virtual circle 604. The headset may then configure its eye tracking software accordingly based on tracking the user's eyes as the user looks at the star 602 and then circle 604 in sequence per the example of FIGS. 7 and 8.

Figure 9:
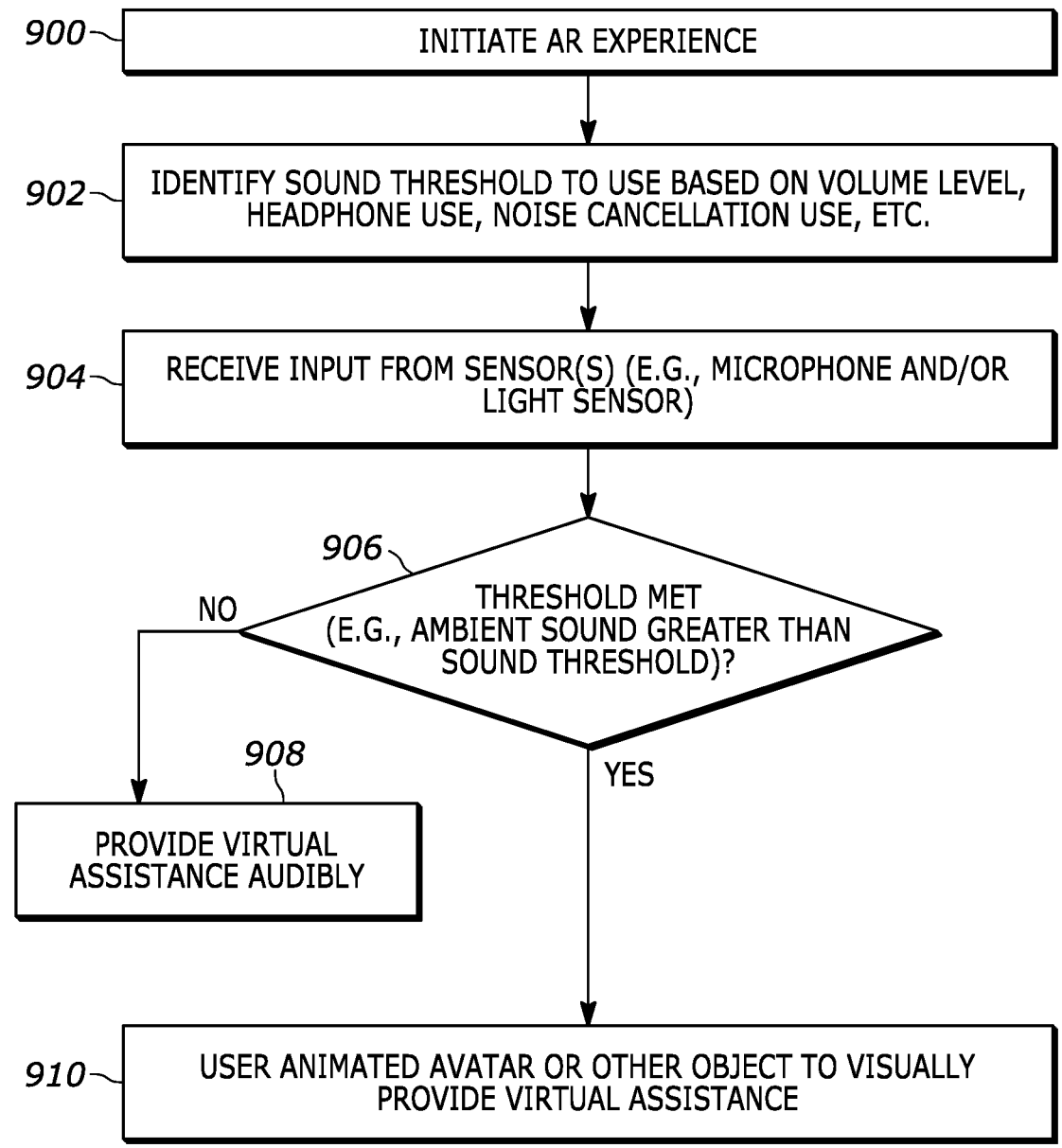
FIG. 9 is a flow chart of an example algorithm that may be executed by an AR device consistent with present principles.

Before describing FIG. 9, it is to be understood consistent with present principles that in some examples the text/visual instructions described above in reference to FIGS. 5, 7, and 8 may be presented by themselves on a headset display without the headset also presenting an avatar or other character. In these embodiments, the text itself may be presented as closed captioning or subtitles toward the bottom of the headset's display, for example.

Now referring to FIG. 9, it shows example logic that may be executed by a device such a headset, a device that controls the headset (e.g., a smart phone), and/or another type of AR device besides a headset consistent with present principles. Beginning at block 900, the device may initiate an AR experience at the headset, such as by accessing an AR game or other AR program stored at the headset (or remotely) responsive to user command. The logic may then proceed to block 902.

At block 902 the device may, at runtime of the AR experience, identify a sound threshold to use. On that, note that a sound threshold consistent with present principles may vary in certain instances based on various factors so that the sound threshold is higher or lower in a given instance. For example, the sound threshold may vary based on a volume level at which audio is set to be output using one or more speakers accessible to the headset or other device controlling the headset. The sound threshold may also vary based on the type and/or characteristics of the audio rendering device that will used to provide virtual assistance audibly (e.g., whether headphones or loudspeakers are or will be used to output audio associated with a function or AR experience of the headset). Additionally, the sound threshold may vary based on whether noise cancelling software is or will be used to output sound to cancel other sound (e.g., ambient sound) unrelated to the AR experience or function while the AR experience is itself being presented or while the function itself is being executed.

If volume level is used as a factor, the volume level may be a current user-set volume level, for example. If whether headphones or loudspeakers will be used to output audio is used as a factor, the headset may determine as much based on whether headphones are currently connected to the headset or associated device (via wired or wireless communication), whether the headset is currently connected to an external loudspeaker for outputting audio, and/or whether the headset is currently configured to output audio via its own respective loudspeaker located on the headset. If whether noise cancelling software will be used to output sound is used as a factor, the headset may determine whether the headset or a device controlling it (e.g., smart phone) is currently or scheduled to execute noise cancelling software to cancel ambient noise and thus allow the user to hear audio for the AR experience presented via the headset itself.

Still in reference to block 902, responsive to identifying one or more of the factors described above, the device may access a relational database that may have been preconfigured by a system administrator. The relational database may be stored in local storage at the headset or may be stored remotely, but in either case may indicate various sound thresholds to use for various factors or combinations of factors that may be present in a given circumstance. The appropriate sound threshold may thus be identified from the relational database at block 902 and the logic may then proceed to block 904.

At block 904 the device may receive input from one or more sensors on or in communication with the device, such as a microphone similar to the microphone 191 described above and/or a light sensor similar to the light sensor 193 described above (e.g., a camera). The logic may then proceed to decision diamond 906.

At diamond 906 the device may determine whether one or more thresholds have been met based on the input received at block 904. For example, at diamond 906 the device may determine whether a current level of ambient sound sensed and indicated in input from the microphone as received at block 904 is above the sound threshold identified at block 902. The current level of ambient sound may be determined by the device by, for example, passing the microphone input through an electronic equalizer capable of outputting volume measurements in decibels or other metrics, and/or by simply determining the amplitude of the sound indicated in the microphone input. Other audio analysis software may be used as well, such as a decibel reader/meter application. The logic may then either move to block 908 responsive to a determination that the ambient sound is below the sound threshold to provide virtual assistance audibly consistent with present principles, or move to block 910 responsive to a determination that the sound is above the sound threshold to visually present virtual assistance on the headset's display consistent with present principles (e.g., using an avatar or other character presented on the display).

However, also note consistent with present principles that in some examples a low light threshold may also be used (or, alternatively, a "too bright" or high-light threshold may be used). The light threshold may be set by a system administrator and then stored in local or remote storage accessible to the headset for the headset to identify it at block 902. In such an implementation, after receiving input from a light sensor at block 904, the device may determine at diamond 906 whether a current level of light (e.g., ambient or otherwise) as sensed and indicated in the input from the light sensor is above the low light threshold (or below the "too bright" threshold, if applicable).

The current level of light may be determined by the device by, for example, averaging the measurements of different amounts of light that fall onto different pixels of the camera, or by selecting a measurement for one of the pixels that indicates the most amount of light from amongst all of the pixel measurements. If a silicon photo diode or other photo diode is used rather than a camera, the measured light amount itself as received from the photo diode may be used to determine whether the current level of light as indicated via the measurement is above the light threshold.

The logic may then either move to block 908 responsive to a determination that the light indicated in the input is above the low light threshold to provide virtual assistance audibly consistent with present principles, or move to block 910 responsive to a determination that the light indicated in the input is below the low light threshold to visually present visual virtual assistance on the headset's display consistent with present principles (e.g., using an avatar or other character presented on the display). Thus, the low light threshold may be used to provide audible assistance in relatively high-light environments, while visual assistance may be provided in relatively low-light environments. This may be done in some example implementations based on the understanding that virtual objects or other images presented on the headset's transparent display may be more difficult to visually perceive when greater amounts of ambient external light exist in the user's environment than when lesser amounts of ambient external light exist in the user's environment.

Additionally, note that the low light threshold may be used in combination with, or in lieu of, the sound threshold. So, for example, if the outcome of both sound and light threshold determinations performed at diamond 906 both lead to one of the blocks 908 or 910, then the corresponding virtual assistance for that respective block may be provided. However, if there is a conflict between which of blocks 908 and 910 to execute since one of the sound and light thresholds may be met while the other may not be met, then a higher-weighted one of the thresholds may be selected as the one to apply and hence use to determine whether to proceed to one of blocks 908 or 910. The weightings of the sound and low light thresholds may be preestablished by a system administrator or the end-user, for example, so that whatever one of the thresholds is weighted higher may thus be selected by the headset to control the outcome of the determination performed at block 906 when a conflict exists.

Concluding the description of FIG. 9, also note that regardless of whether block 908 or block 910 is reached in a given instance, after either block the logic may then revert back to block 902 to continue executing the logic. For example, an ambient sound level may go from higher than the sound threshold to lower than the sound threshold, and thus the logic may revert to block 902 from block 910 in order to determine whether the device should switch to presenting audible virtual assistance based on the change in ambient sound level during an AR experience.

Figure 10:
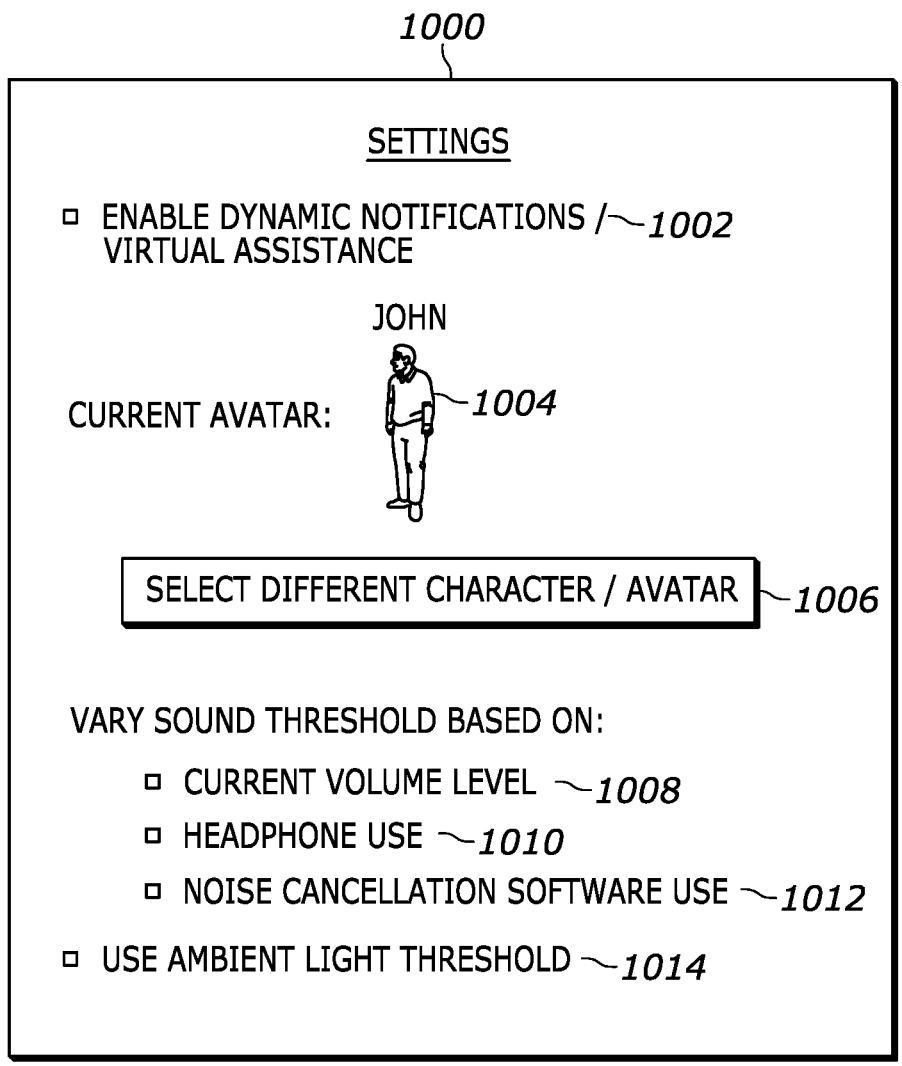
FIG. 10 shows an example graphical user interface (GUI) that may be presented on a display for configuring one or more settings of an AR device consistent with present principles.

Continuing the detailed description in reference to FIG. 10, it shows an example graphical user interface (GUI) 1000 that may be presented on the display of a headset or another device in communication with and controlling the headset (e.g., smart phone or laptop computer). The GUI 1000 may be presented for configuring one or more settings of an AR device to operate consistent with present principles. It is to be understood that each of the options to be discussed below may be selected by voice command, by directing touch or cursor input to the adjacent check box, etc.

As shown in FIG. 10, the GUI 1000 may include a first option 1002 that may be selectable to set or configure the device to, in the future, dynamically present audible or visual notifications/virtual assistance as described herein. For example, selection of the option 1002 may enable the device to use one or more sound or light thresholds as described herein, execute functions consistent with the examples of FIGS. 4-8 above, and/or execute the logic of FIG. 9 described above.

The GUI 1000 may also include a graphical representation 1004 of a currently-selected avatar named "John" that will be presented as part of visual virtual assistance consistent with present principles. The user may change to a different character by selecting the selector 1006, which in turn may cause a listing or library of available characters to be presented from which the user may select a different character for the device to use as part of visual virtual assistance.

As also shown in FIG. 10, the GUI 1000 may present one or more options that may be selected by the user to set or configure the device to use one or more associated factors for dynamically determining a sound threshold to use consistent with present principles. For example, option 1008 may be selected to enable the device to use a currently-set volume output level as a factor, option 1010 may be selected to enable the device to use headphone use as a factor, and option 1012 may be selected to enable noise cancellation software use as a factor.

Additionally, in some examples the GUI 1000 may further include an option 1014. The option 1014 may be selected to set or enable the device to use a low light threshold as described herein for determining whether to provide audible or visual virtual assistance.

Still further, although not shown for simplicity, in some examples an input box may be presented on the GUI 1000 for the user to specify a threshold level of sound to use consistent with present principles. For example, the user may enter a number into the input box to specify a number of decibels at which the threshold level of sound should be set. Even further but also not shown for simplicity, in some examples the GUI 1000 may include respective input boxes for establishing respective weights for a sound threshold and low light threshold when both are to be used consistent with present principles to resolve any conflict as described above in reference to FIG. 9.

It may now be appreciated that present principles provide for an improved computer-based user interface that improves the functionality and ease of use of the AR devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
   at least one processor;
   a display accessible to the at least one processor, the display configured to present stereoscopic images; and
   storage accessible to the at least one processor and comprising instructions executable by the at least one processor to:
   initiate a calibration process for calibrating eye tracking to a particular user, the eye tracking being executable at least in part using the headset;
   receive, at the headset, input from at least one sensor;
   based at least in part on the input from the at least one sensor, determine whether a first threshold is met, the first threshold being a sound threshold or a light threshold;
   based on initiation of the calibration process and responsive to the first threshold not being met, provide virtual assistance audibly that indicates that the particular user is to look at first and second graphical objects presented on the display in a particular sequence for calibrating the eye tracking;
   based on initiation of the calibration process and responsive to the first threshold being met, present, on the display, visual virtual assistance that indicates that the particular user is to look at the first and second graphical objects presented on the display in the particular sequence for calibrating the eye tracking; and
   based on the calibration process, subsequently execute the eye tracking as part of presentation of an augmented reality (AR) experience provided via the headset, presentation of the AR experience comprising presenting stereoscopic images on the display.

2. The headset of claim 1, wherein the at least one sensor comprises a microphone, wherein the first threshold is a sound threshold, and wherein the instructions are executable to:
   receive input from the microphone;
   based at least in part on the input from the microphone, determine whether sound indicated in the input from the microphone is above the sound threshold;
   responsive to the sound being below the sound threshold, provide the virtual assistance audibly; and
   responsive to the sound being above the sound threshold, present, on the display, the visual virtual assistance.

3. The headset of claim 2, wherein the sound threshold is a dynamic sound threshold that varies based on a volume level at which audio is set to be output, the dynamic sound threshold being identified from a relational database based on a current volume level at which audio is set to be output.

4. The headset of claim 2, wherein the sound threshold is a dynamic sound threshold that varies based on a type of audio rendering device that is to be used to output audio associated with a function of the headset, the dynamic sound threshold being identified from a relational database based the type of audio rendering device that is to be used to output audio associated with the function of the headset.

5. The headset of claim 2, wherein the sound threshold is a dynamic sound threshold that varies based on whether noise cancelling software will be used in conjunction with a function of the headset in order to cancel ambient sound detected via the headset.

6. The headset of claim 1, wherein the at least one sensor comprises a light sensor, wherein the first threshold is a low light threshold, and wherein the instructions are executable to:
   receive input from the light sensor;
   based at least in part on the input from the light sensor, determine whether light indicated in the input from the light sensor is above the low light threshold;
   responsive to the light indicated in the input being above the low light threshold, provide the virtual assistance audibly; and
   responsive to the light indicated in the input being below the low light threshold, present, on the display, the visual virtual assistance.

7. The headset of claim 1, wherein the headset is established at least in part by computerized glasses.

8. The headset of claim 1, wherein the display is a transparent display.

9. The headset of claim 1, wherein the visual virtual assistance comprises instructions provided via text presented on the display.

10. The headset of claim 1, wherein the visual virtual assistance comprises animation of a third graphical object presented on the display.

11. The headset of claim 10, wherein the third graphical object gestures in sequence to the first graphical object and then to the second graphical object to indicate that the particular user is to look at the first graphical object and then the second graphical object.

12. The headset of claim 11, wherein the third graphical object moves on the display from the first graphical object to the second graphical object to indicate that the particular user is to look at the first graphical object and then the second graphical object.

13. The headset of claim 1, wherein the instructions are executable to:
   during the calibration process, present the first graphical object but not the second graphical object;
   determine that the particular user has looked at the first graphical object;
   based on determining that the particular user has looked at the first graphical object, present the second graphical object.

14. The headset of claim 13, wherein the instructions are executable to:
based on determining that the particular user has looked at the first graphical object, remove the first graphical object from presentation on the display and present the second graphical object.

15. A method, comprising:
initiating a calibration process for calibrating eye tracking to a particular user, the eye tracking being executable at least in part using a device;
receiving input from at least one sensor;
based at least in part on the input from the at least one sensor, determining whether a first threshold is met, the first threshold being a sound threshold or a light threshold;
based on initiation of the calibration process and based on identifying in a first instance that the first threshold has not been met, providing virtual assistance audibly that indicates that the particular user is to look at first and second graphical objects presented on a display in a particular sequence for calibrating the eye tracking;
based on initiation of the calibration process and based on identifying in a second instance that the first threshold has been met, presenting, on the display, visual virtual assistance that indicates that the particular user is to look at the first and second graphical objects presented on the display in the particular sequence for calibrating the eye tracking; and
subsequently executing the eye tracking at the device according to the calibration process to control presentation of an augmented reality (AR) experience provided via the device.

16. The method of claim 15, wherein the at least one sensor comprises a microphone, wherein the first threshold is a sound threshold, and wherein the method comprises:
receiving input from the microphone;
based at least in part on the input from the microphone, determining whether sound indicated in the input from the microphone is above the sound threshold;
responsive to the sound being below the sound threshold, providing the virtual assistance audibly; and
responsive to the sound being above the sound threshold, presenting, on the display, the visual virtual assistance.

17. The method of claim 16, wherein the sound threshold varies based on a volume level at which audio is set to be output using the device, wherein the varying sound threshold to apply in a given instance is identified from a relational database based on a current volume level at which audio is set to be output.

18. The method of claim 15, wherein the at least one sensor comprises a light sensor, wherein the first threshold is a low light threshold, and wherein the method comprises:
receiving input from the light sensor;
based at least in part on the input from the light sensor, determining whether light indicated in the input from the light sensor is above the low light threshold;
responsive to the light indicated in the input being above the low light threshold, providing the virtual assistance audibly; and
responsive to the light indicated in the input being below the low light threshold, presenting, on the display, the visual virtual assistance.

19. The method of claim 15, comprising:
presenting the AR experience at least in part by presenting stereoscopic images on the display.

20. At least one computer readable storage medium (CRSM) that is not a transitory signal, the computer readable storage medium comprising instructions executable by at least one processor to:
initiate a calibration process for tailoring eye tracking settings to a particular user, the eye tracking settings being used as part of eye tracking executable at least in part using the at least one processor;
receive input from a sensor accessible to the at least one processor;
based at least in part on the input from the sensor, determine whether a first threshold is met, the first threshold being a sound threshold or a light threshold;
based on initiation of the calibration process and responsive to the first threshold not being met, provide one or more notifications audibly using the at least one processor that indicate that the particular user is to look at first and second graphical objects presented on the display in a particular sequence for tailoring the eye tracking settings;
based on initiation of the calibration process and responsive to the first threshold being met, present, on a display accessible to the at least one processor, one or more visual notifications that indicate that the particular user is to look at the first and second graphical objects presented on the display in the particular sequence for tailoring the eye tracking settings;
tailor the eye tracking settings based on the particular user looking at the first and second graphical objects in the particular sequence; and
execute eye tracking according to the eye tracking settings tailored to the particular user as part of presentation of an augmented reality (AR) experience provided via the at least one processor.

* * * * *